US012811285B2

(12) United States Patent
Oakey et al.

(10) Patent No.: US 12,811,285 B2
(45) Date of Patent: Nov. 24, 2026

(54) ENVIRONMENTALLY ROBUST FABRIC RADOME FOR PLANAR MMWAVE BEAM-STEERING ANTENNAS

(71) Applicant: All.Space Networks Limited, Reading (GB)

(72) Inventors: Ryan Oakey, Reading (GB); Ian Willmott, Hermitage (GB)

(73) Assignee: All.Space Networks Limited, Reading (GB)

( * ) Notice: Subject to any disclaimer, the term of this patent is extended or adjusted under 35 U.S.C. 154(b) by 70 days.

(21) Appl. No.: 18/181,498

(22) Filed: Mar. 9, 2023

(65) Prior Publication Data

US 2023/0291095 A1 Sep. 14, 2023

Related U.S. Application Data

(63) Continuation of application No. PCT/GB2023/050533, filed on Mar. 7, 2023.

(30) Foreign Application Priority Data

Mar. 11, 2022 (GB) ..................................... 2203426

(51) Int. Cl.
*H01Q 1/42* (2006.01)

(52) U.S. Cl.
CPC .................................. *H01Q 1/427* (2013.01)

(58) Field of Classification Search
CPC ............................... H01Q 1/427; H01Q 1/428
See application file for complete search history.

(56) References Cited

U.S. PATENT DOCUMENTS

| | | | | |
|---|---|---|---|---|
| 10,116,051 | B2 | 10/2018 | Scarborough et al. | |
| 2021/0208284 | A1 | 7/2021 | Zavrel et al. | |
| 2021/0208286 | A1 | 7/2021 | Turpin et al. | |
| 2024/0008612 | A1* | 1/2024 | Moy | H01Q 1/246 |
| 2024/0097307 | A1* | 3/2024 | Zimmerman | H01Q 1/42 |

FOREIGN PATENT DOCUMENTS

| | | | |
|---|---|---|---|
| JP | H05-83022 | A | 4/1993 |
| JP | H0936653 | A * | 2/1997 |

OTHER PUBLICATIONS

Search Report Under Section 17(5) dated Jul. 22, 2022 in connection with United Kingdom Patent Application No. GB2203426.8.

* cited by examiner

*Primary Examiner* — Alexander H Taningco
*Assistant Examiner* — Anna H Hamadyk
(74) *Attorney, Agent, or Firm* — Wolf, Greenfield & Sacks, P.C.

(57) ABSTRACT

A radome assembly for an antenna, comprises: a mounting ring comprising an annular bonding surface; a layer of radome fabric or film bonded to the annular bonding surface and extending radially inwardly and radially outwardly of the bonding surface; and an annular enclosing element located radially outwardly of the bonding surface which encloses or covers at least a portion of the fabric of film radially outward of the annular bonding surface.

23 Claims, 8 Drawing Sheets

Figure 1 (a) (Prior Art)

Figure 1 (b) (Prior Art)

Figure 2 (a) (Prior Art)

Figure 2 (b) (Prior Art)

Figure 3 (a) (Prior Art)

Figure 3 (b) (Prior Art)

ENVIRONMENTALLY ROBUST FABRIC RADOME FOR PLANAR MMWAVE BEAM-STEERING ANTENNAS

CROSS-REFERENCE TO RELATED APPLICATIONS

This application claims the benefit of priority under 35 U.S.C. § 119 from United Kingdom Patent Application GB2203426.8, filed Mar. 11, 2022, and entitled "ENVIRONMENTALLY ROBUST FABRIC RADOME FOR PLANAR mmWAVE BEAM-STEERING ANTENNAS," which is hereby incorporated by reference herein in its entirety.

This application is a Continuation of International Patent Application Serial No. PCT/GB2023/050533, filed Mar. 7, 2023, and entitled "ENVIRONMENTALLY ROBUST FABRIC RADOME FOR PLANAR mmWAVE BEAM-STEERING ANTENNAS," which is hereby incorporated by reference herein in its entirety.

International Patent Application Serial No. PCT/GB2023/050533 claims the benefit of priority from United Kingdom Patent Application GB2203426.8, filed Mar. 11, 2022, and entitled "ENVIRONMENTALLY ROBUST FABRIC RADOME FOR PLANAR mmWAVE BEAM-STEERING ANTENNAS," which is hereby incorporated by reference herein in its entirety.

FIELD OF THE DISCLOSURE

The present disclosure relates to radome assemblies for antennas and in particular, but not exclusively, to a tensioned fabric radome intended for use with a substantially planar antenna operating in the microwave and/or millimeter-wave (mmWave) bands.

BACKGROUND

Antennas intended to communicate with satellites in the microwave and mmWave VSAT frequency bands, approximately 6 to 100 GHz, typically take the form of an electrically-steered phased array, mechanically gimballed or steered parabolic reflector, or passive flat panel antenna. Electrically-steered antennas are typically planar (or nearly-planar), while most (but not all) mechanically-pointed antennas take up a substantial height. The performance of all microwave or mmWave antennas is sensitive to the presence of water, dirt, dust, sand, and other debris at the aperture as well as within the electronics themselves. A radome is used to prevent incursion of water and other environmental debris. Depending on the geometry of the antenna, a radome can take various forms including a flat window for an antenna recessed beneath the skin of a platform, a substantially curved and self-supporting dome shape to cover antennas that require gross movement of the antenna under the radome, or flat or planar, but still self-supporting, covers for substantially flat or planar antennas.

A radome must act both as an environmental cover and protection for the aperture and sensitive electronics of the antenna, as well as an efficient microwave or mmWave transparent window to allow the radio waves to pass through the radome with minimal reflection or absorptive losses. These two requirements are often at odds, and severely limit the materials and styles of construction for radomes of high-performance antennas. The efficiency of a radome can be measured as the fraction of the signal that is lost upon passing through the radome. A radome for an antenna system with 0 to 0.5 dB of signal loss across the worst-case operational frequency and scan angle can be considered high performance. In some applications, up to 1 to 3 dB of reflection and absorption losses can be accepted; relaxing the loss constraint allows simpler and lower-cost radomes to be used.

The thickness of a radome is related to the wavelength of operation, with tighter constraints for high frequency use. Low-loss radomes for use with microwave or mmWave antennas must either be very thin (small fractions of a wavelength), very low dielectric constant (dielectric constant close to air), constructed from a precise stack-up of layers of different materials to form a resonant window, or some combination of all three options to achieve the high performance that is required to work with weak signals from a satellite. For most mobility satellite communications (SATCOM) terminals that use gimbaled passive flat panels or reflectors, a self-supporting dome is required. Such a dome must withstand both the shock and vibration of the platform (which can be substantial in maritime and land mobility applications), as well as environmental impacts such as high wind, snow, rain, hail, etc. Multilayer composite structures composed of fiberglass (or other fiber material) together with layers of different resins, foams, and/or other polymers are a common solution. Such structures, composed of 3 or more layers of different materials laminated together and processed at high temperature and pressure can be very effective and take on many shapes and sizes, but are expensive and require specialized tooling. Such multilayer radomes are designed to operate over a specific range of frequencies—their high efficiency is due to hitting tight tolerances on thicknesses of alternating layers of material with different dielectric properties to create an electromagnetic resonance that maximizes radio wave transmission through the radome.

Low-cost alternatives include single layers of a thin polymer formed to shape, but the RF performance is often lacking. The material must be less than a quarter of a wavelength in order to achieve high transmissions of RF energy across a wide range of angles without reflections or absorption, but a thin enough sheet of polymer to allow efficient operation at (for example) 30 GHz will not be mechanically robust enough across a 40 cm, 80 cm, 1.2 m, or larger apertures often required by enterprise and government end users. Thickening the plastic sheet or adding ribs or other mechanical stiffeners to meet mechanical and environmental requirements degrades the RF performance.

A planar antenna with a substantially planar and low-profile radome has an even bigger challenge than a gimbaled antenna with a domed radome. All radome structures interact with electromagnetic waves based on the frequency of operation and geometric structure (thickness, layers, material properties) of the radome itself coupled with the angle of incidence of the wave. An RF wave striking a radome generally perpendicular to the local surface will suffer less reflected (and otherwise lost) energy than a wave striking a surface at an angle. Past a certain point (the critical angle), all of the energy in the wave will be reflected, and the surface acts like a mirror rather than a window.

A domed radome has a relatively low and consistent incidence angle for beams scanned in any direction. The shape of the top radome surface can be described as generally spherical in shape, where the origin of the sphere is approximately collocated with the center of the reflector or flat panel (from which the RF wave emanates). In this way, the wave is always exiting the radome in a way that the surface of the radome is approximately perpendicular to the direction of wave travel.

For a planar antenna aperture and radome, where the radome and the aperture do not change their orientation to scan in different directions, the incidence angle of the wave on the radome is different for every scan angle. For a planar antenna scanning at 70 degrees down from boresight (also described as scanning to 20 degrees in elevation), the radome must operate efficiently for a 70 deg incident wave, whereas a domed radome may only need to operate efficiently for incidence angle up to 20 or 30 degrees.

A multilayer resonant radome can overcome these scan angle constraints, but only with many layers and a very thick stack-up, which limits the usefulness of that solution. A very thin layer (0.1 to 0.5 mm) of polymer or other material, such as a fiber-polymer composite fabric, can meet stringent RF performance requirements even out to far scan angles of 60-70 deg, but is not self-supporting, and must be used in a completely planar edge-tensioned configuration to avoid the presence of ribs or other RF blockers in front of the aperture. The polymer-infused fiber-type fabric for radome does not bend or wrap conformally around different shapes easily, and any wrinkles or folds in the path of the RF energy significantly affects the response. Fabric radomes are used for unsteered terrestrial point-point microwave antennas, but the mounting hardware for the fabric needs only to support a single scan angle, not a range of scan angles. A piece of fabric bonded or clamped between one or two rings can support the tension and strength requirements of the radome, but any protrusion of a support structure above the surface of the radome can capture water and debris, and an exposed edge of the fabric can lead to degradation and premature failure of the material. An alternate structure for securing the thin composite fabric to create a radome suitable for a planar, beam-steering is needed.

BRIEF SUMMARY OF THE DISCLOSURE

Aspects of the invention provide a radome assembly for an antenna and include a mounting ring comprising an annular bonding surface. A layer of radome fabric or film is bonded to the annular bonding surface and extends radially inwardly and radially outwardly of the bonding surface. An annular enclosing element is located radially outwardly of the bonding surface which encloses or covers at least a portion of the fabric of film radially outward of the annular bonding surface.

The annular bonding surface maintains tension in the radome fabric or film and the portion of the layer of radome fabric or film radially outward of the annular bonding surface is enclosed by the annular enclosing element which environmentally seals the assembly without introducing a lip or protrusion from the surface of the radome fabric or film that could result in a build-up of precipitation or debris when used while in a level and planar configuration.

The annular enclosing element may enclose or cover the periphery of the layer of radome fabric or film.

The annular bonding surface may be substantially planar and all portions of the bonding surface may lie in the same plane.

The radome fabric or film radially inwardly of the annular bonding surface may be continuous and substantially planar.

The radome assembly may comprise a projection which extends outwardly beyond the bonding surface, with which the radome fabric or film is in contact.

As the radome fabric or film is draped or stretched over the projection, its centre is raised above the level of the annular bonding surface, assuming the shape of a very shallow cone, and thereby prevents puddles of water or other liquid forming on the surface of the fabric or film.

Preferably, the projection is located centrally with respect to the annular bonding surface.

Advantageously, the projection may comprise a foam material.

The foam material is preferably of low dielectric constant.

The mounting ring may define a longitudinal axis and the annular bonding surface may be located at one end of the mounting ring.

The annular bonding surface may be located at the longitudinally outermost portion of the mounting ring.

The mounting ring may comprise an annular wall on which the annular bonding surface is formed.

The annular bonding surface may be formed on a radially innermost portion of the annular wall.

The mounting ring may comprise a convexly curved portion on its outer surface radially outwardly of the annular bonding surface.

In one embodiment, the annular enclosing element comprises an annular member which is positionable over at least a portion of the radome fabric or film radially outward of the annular bonding surface.

The annular member may be positionable over the periphery of the radome fabric or film.

An inner face of the annular member may be complementarily-shaped with an outer face of the mounting ring.

At least a portion of the fabric or film radially outward of the annular bonding surface may be clamped between the mounting ring and the annular member.

The annular member may be releasably attached, e.g. releasably attached to the mounting ring.

Alternatively, the annular enclosing element may comprise a ring of tape secured to the periphery of the fabric or film and to a portion of the mounting ring located radially outward of the periphery of the fabric or film.

The annular enclosing element may comprise a cured or set annular member, e.g. a cured sealant.

The mounting ring may comprise an annular recess radially outwardly of the annular bonding surface which receives a portion of the layer of radome fabric or film and the cured or set annular member.

The periphery of the layer of radome fabric or film may be received in the annular recess.

The radome assembly may comprise a continuous smooth profile between the cured or set annular member and the outer surface of the mounting ring.

The radome assembly may comprise a continuous smooth profile between the cured or set annular member and the portion of the radome fabric or film bonded to the annular bonding surface.

The radome assembly may further comprise a support base for mounting an antenna.

Preferably, the mounting ring extends from the support base.

The radome assembly may comprise seal means between the support base and the mounting ring.

The mounting ring may comprise an upstanding wall below the level of the annular bonding surface and the seal means may be located at an interface between the upstanding wall and the support base.

The seal means may be located at an interface between an end face of the mounting ring and the support base.

Preferably, the radome fabric or film is flexible.

The present disclosure describes a multi-piece hybrid secured-and-bonded mounting mechanism for a fabric radome for use over a substantially planar beam-steering antenna (such as an electronically-steered phased array). The radome consists of a thin RF-transparent composite fabric tensioned and bonded to a specially-shaped bonding ring. The radome assembly may further comprise an encapsulating ring that clamps and secures the edge of the fabric below the top of the bonding ring, where the shapes of the bonding and clamping rings are structured so as to give both strength and a thin profile. The radome as a whole can then be sealed or mounted to cover an antenna aperture in numerous ways. The two rings jointly fasten and seal the fabric against environmental conditions, maintain a planar top surface of the radome without a lip to catch water or debris, encapsulate the edge of the fabric to prevent moisture incursion and fraying, minimize the effect of the mounting mechanism on the RF performance of beams scanned to low elevation angles, and allow an attractive shape or profile to the radome corners.

BRIEF DESCRIPTION OF THE DRAWINGS

By way of example only, exemplary embodiments of the present disclosure will now be described with reference to the accompanying drawings, in which:

FIG. 1 (*b*) (Prior Art) illustrates the large incidence angles of a RF signal from a gimbaled antenna steered to a low elevation angle on a domed radome;

FIG. 1 (*c*) illustrates the large incidence angles of a RF signal from a planar beam-steering antenna steered to zenith on a substantially planar radome;

FIG. 1 (*d*) illustrates the grazing incidence angles of a RF signal from a planar beam-steering antenna steered to a low elevation angle on a substantially planar radome;

FIG. 2 (*b*) (Prior Art) illustrates a representative resonant 5-layer multilayer composite radome cross-section and its representative scan angle and frequency performance;

FIG. 2 (*c*) illustrates an electrically-thin non-resonant radome cross-section and its representative scan angle and frequency performance;

FIG. 3 (*b*) (Prior Art) illustrates a one-piece bonded mounting structure for a fabric radome over a planar beam-steering antenna;

FIG. 3 (*c*) illustrates the preferred surface and thickness profile for a radome over a planar, low-profile mmWave antenna aperture.

FIG. 4 (*b*) is a vertical cross-section through the radome assembly of FIG. 4(*a*), showing the multi-piece hybrid clamping-bonding mounting structure at a larger scale;

FIG. 4 (*c*) is a top view of the radome assembly of FIG. 4(*a*);

FIG. 5 (*b*) is a vertical cross-section through a second modification of the radome assembly of FIG. 4(*a*), showing a horizontal registration and sealing mechanism to secure a radome to an antenna base;

FIG. 6 (*b*) is a top view of the radome assembly of FIG. 6 (*a*);

DETAILED DESCRIPTION

Figure 1:
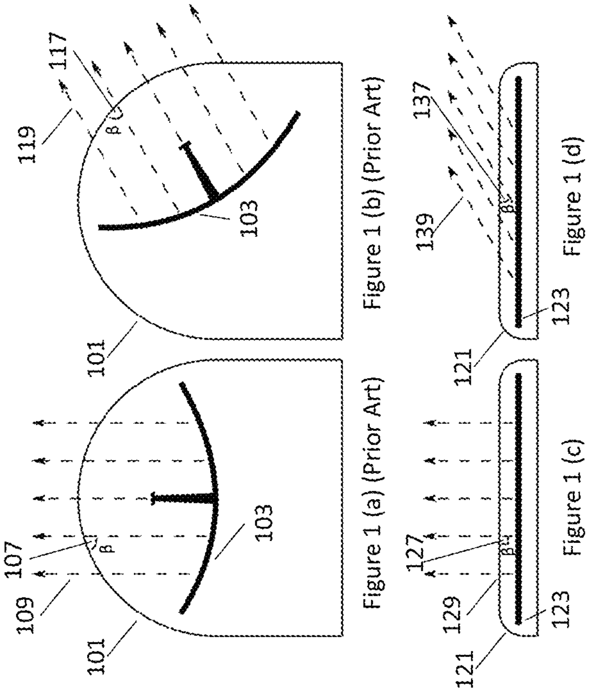
FIG. 1 (*a*) (Prior Art) illustrates the large incidence angles of a RF signal from a gimbaled antenna steered to zenith on a domed radome.

The accompanying drawings are incorporated in and constitute a part of this specification. It is to be understood that the drawings illustrate only some examples of the disclosure and other examples or combinations of various examples that are not specifically illustrated in the drawings may still fall within the scope of this disclosure. Examples will now be described with additional detail through the use of the drawings.

An implementation of this disclosure consists of a mounting arrangement for an electrically-thin fabric radome for use with a low-profile electrically-steered mmWave antenna designed to operate in a generally planar manner, while providing structural and mechanical support to the radome material and simultaneously yielding an attractive shape and design without creating a lip or any other feature to trap water or other debris.

Electrically-thin fabric radomes for low-profile high-performance mmWave antennas are motivated by the challenges that occur with standard radome construction practices.

The typical on-the-move SATCOM terminal radome is illustrated in FIG. 1 (*a*)-(*b*), where a reflector antenna 103 is placed inside the dome radome 101 and allowed to point in different directions to follow the target satellite while either the satellite moves, the platform moves, or both. Two exemplary cases are shown, with FIG. 1 (*a*) showing an antenna steered to zenith, while FIG. 1 (*b*) shows an antenna steered to a far scanning angle close to the horizon. The domed radome for a parabolic antenna is required to fit the reflector antenna in any possible orientation, but also offers a benefit in performance. Due to the size and radius of the radome compared to the reflector, the waves 109, 119 leaving the antenna 103 do so in a way that is largely independent of the direction of beam steering. The incidence angle 107 of the rays 109 upon the radome 101 when the antenna 103 is pointed at zenith are effectively the same as the incidence angle 117 of the rays 119 upon the radome 101 when the antenna 103 is pointed at a far scan angle. In this way, the performance of the antenna-radome combination does not subject much in the way of changing performance when pointed in different directions, and the radome can be optimized for the minimum incidence angle while also meeting requirements for being self-supporting.

For planar, low-profile antennas such as phased arrays, VICTS (Variable-Inclination Continuously Tapered Stub) antennas, planar metamaterial or liquid crystal-based antenna, or lens array antenna, a large dome centered on the phase center of the antenna is undesirable due to the height. Many of the benefits of these antenna types over conventional reflector antennas is their height, so a low-profile antenna couple with a tall radome defeats the purpose of the design, regardless of any performance improvements due to the dome. Thus, planar antennas in practice require an at least substantially-planar radome, as illustrated in FIG. 1 (*c*)-(*d*). Here, a generally planar antenna aperture 123 is located inside a substantially planar radome 121, where the zenith-directed waves 129 pass through the radome 121 with high incidence angle 127, while the scanned waves 139 pass through the radome 121 with low incidence angle 137, leading to potentially high reflections and losses. This change in the incidence angle of the waves through the radome from a flat antenna means that a scanned beam has higher losses than a zenith or boresight beam, compounding with the performance losses that come from any planar antenna when scanned to low elevation angles.

Mitigating the reflections and other losses of a scanned beam incident on a planar radome requires careful design trades. Radomes will typically either take the form of a multilayer resonant stack, which can offer low reflections and losses through careful combinations of different layer types and thicknesses but have limited frequencies over which they will operate, or through simply using an electrically-thin enough material that it interacts minimally with the desired RF signal. Electrically-thin structures are preferable at lower frequencies, but are challenging to design to achieve both RF and mechanical requirements for shorter wavelengths such as those encountered in the microwave and mmWave bands.

Figure 2:
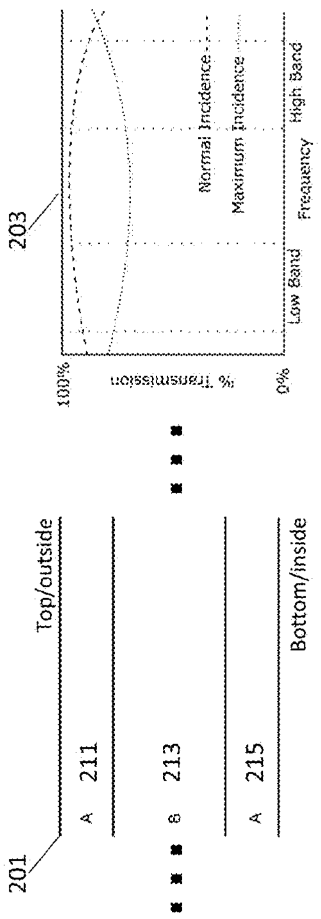
FIG. 2 (*a*) (Prior Art) illustrates a representative resonant 3-layer multilayer composite radome cross-section and its representative scan angle and frequency performance.
Figure 2:
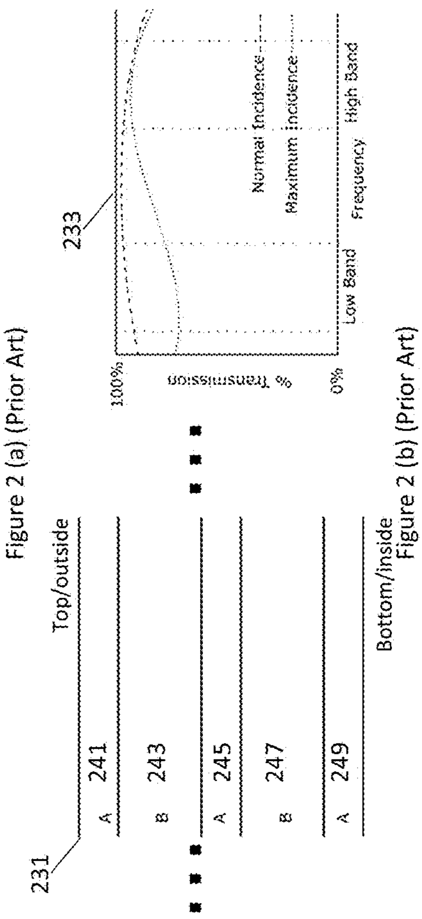
Figure 2:
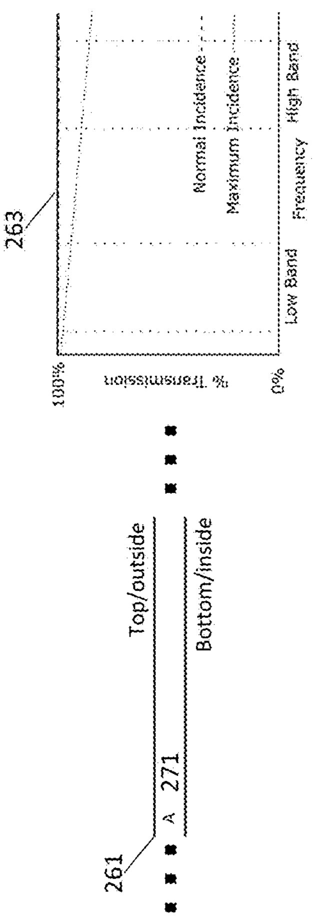

FIG. 2 (*a*) illustrates a representative three-layer laminate/composite radome stackup 201, such as those taught in many textbooks and well known in the art. The material properties of the three layers 211, 213, and 214 are selected to achieve a desirable frequency and angular response as illustrated in the chart 203. Although many combinations are possible, a particular class of designs that is preferred for manufacturing and mechanical reasons is to select the outer layers (labeled with an A) 211 and 215 to take the same material properties and thicknesses, and the central layer to be composed of a different material with a different thickness. Often, the outer layers will be composed of a prepreg fiberglass layup that is cured and painted to take on a relatively high dielectric constant between 2.5 to 4. The inner layer is often selected to be a foam or other low-strength, low-dielectric constant material whose thickness can be consistently controlled. The three layers would then be laminated together and cured, and the outer layer painted for UV protection. With only three layers, and a limited number of variables that can be tuned, such a three-layer design often has limited performance on average across all use cases. Here, the performance chart 203 illustrates two frequency bands of particular interest, the "Low Band" and the "High Band". A radome is desired to have 100% transmission across all bands of interest. The performance of the radome, as measured in transmittance, varies across different scan angles and different frequencies, with the frequency response shown on the X-axis, and the angular response illustrated by a trace showing performance across frequency at normal incidence/zenith, and the second trace showing performance across frequency at a wide scan angle/small incidence angle of the wave with the radome. This FIG. 203 shows the trade that is made to center the transmission response between the two beams—neither beam has an optimal response, but their performance is about equal.

Improving the performance of a resonant multilayer radome typically requires the addition of additional layers to the laminate stackup, with the dimensions again selected differently, as illustrated in FIG. 2 (*b*) with radome stackup 231 composed of 5 material layers 241, 243, 245, 247, and 249. Doing so leads to a higher-order resonance that permits more tuning between the frequency and angular responses of the radome, as shown in FIG. 233. By varying the materials used and their thicknesses between layers 241, 243, 245, 247, 249, the transmissivity response 233 of the 5-layer radome can be improved relative to the response of the three-layer radome 203. Here, the additional degrees of design freedom are used to improve the transmissivity at maximum scan angle in the high band at the expense of the low band, illustrating one of the potential design trades. However, the thicker and heavier structure will also be more expensive to manufacture, which leads to challenges during productization.

Since multilayer composite radomes offer cost and performance disadvantages for planar apertures, the only other option is the nonresonant or subresonant electrically-thin radome. For small or low-performance apertures, simple sheets of plastic with formed edges and possibly ribs are feasible, but large apertures (larger than about 20-40 cm) are not suitable for use with unsupported thin polymer radomes due to the large wind loads and other mechanical forces. This leaves only tensioned radomes, either fabric or thin polymer sheets.

FIG. 2 (*c*) shows a single-layer radome stackup 261 composed of a single material layer 271. There is very little control over the transmissivity response 263 of a thin radome other than minimizing the thickness and minimizing the dielectric constant of the structure. Fabrics as thin as 0.4 mm with sufficient tensile strength can be achieved as thermoplastic-fiber composites, such as PTFE and Kevlar™. Since the fabric is thin and flexible, it must either be supported (which requires ribs or other supporting structures that would distort the RF signal passing through it) or be fastened and tensioned in such a way as to be both waterproof and provide sufficient strength against wind and expected debris impacts.

Thin, flexible fabric or thin polymer film radomes have been used on point-point microwave links and other antennas in configurations where size and volume are less critical, allowing the mounting features and tensioning structures to be, in effect, hidden from the main beam of the antenna. This is more challenging for a scanning antenna for a mobility platform, which must be compact both vertically and horizontally to fit onto space-constrained platforms and offer a wide field of view that causes beams to exit the antenna from the edge of the radome.

Figure 3:
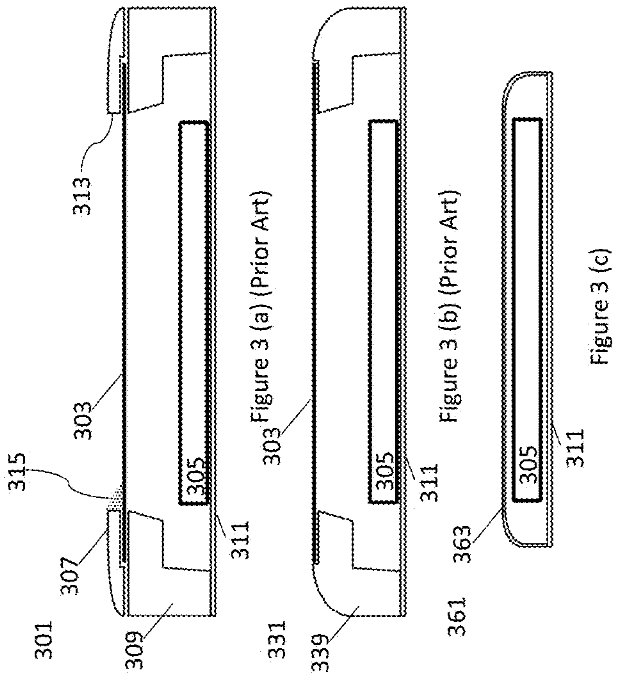
FIG. 3 (*a*) (Prior Art) illustrates a two-piece clamped mounting structure for a fabric radome over a planar beam-steering antenna.

FIGS. 3 (*a*) and (*b*) shows cross sections of solutions from the prior art of tensioning, mounting, and securing a fabric or thin polymer film radome above a substantially planar antenna 305. FIG. 3 (*a*) illustrates a system 301 composed of a fabric radome sheet 303 that is mechanically clamped between two structures 307 and 309 to maintain tension and separation above the antenna 305 while sealing the antenna 305 between the radome structures 303, 307, 309 and the base 311. This implementation 301 has several disadvantages. First, the antenna when scanned to 70 degrees from zenith (boresight) has a substantial area of the aperture where the signals would be forced to propagate through the thick support structures rather than the radome itself, reducing the performance of the antenna at high scan angles. This could be resolved by increasing the width of the radome and therefore the increase in size of the radome mounting structure 307, 309 relative to the antenna 305. However, increasing the size of the radome is undesirable and in some cases unacceptable for particular platforms. In effect, avoiding any degradation of the antenna 305 performance due to the radome mounting structure would require reducing the size of the antenna (and thus the performance) for a given available platform mounting area.

In addition, the implementation 301 creates a lip 313 between the fabric radome 303 and the top mounting ring 307 that would serve to capture and trap water and debris, as shown at 315. Such a lip would not be concerning in an antenna mounted at an angle (such as for a point-point microwave antenna, even a scanning antenna) since the face of the antenna and radome would be nearly vertical, preventing the lip from causing any trouble. However, for scanning SATCOM antennas that are in almost all circumstances horizontal, the creation of a location puddle or build-up of debris on top of the radome would be severely detrimental to the antenna's performance. It is not practical to curve the fabric itself to prevent the buildup of water and debris, since it would need to be supported from below, which would cause an obstruction in the RF signal in the same way as ribs or other support structures.

FIG. 3 (*b*) illustrates a modified solution 331 that resolves the second of the two challenges with the two-piece solution 301. In this case, the fabric radome is chemically bonded or otherwise adhered down to a single mounting ring 339 above the antenna 305. In this way, the top of the radome does not have a lip. The surface of the overall structure of the radome, including the joint between the fabric and the mounting ring 339, can be contoured to a degree and kept smooth by insetting the fabric into a small step down in the supporting ring.

There are limitations in this implementation 331 as well; leaving the edge of the fabric exposed can lead to fraying and moisture incursion through the fibers of the fabric, which can lead to compromise of the environmental seal and the mechanical robustness of the radome. Many of the polymers with desirable properties for fabric radomes, such as PTFE, are difficult to glue or otherwise adhere, and sealing the edge of the radome in such a way that it remains planar without bumps but also achieves a good seal is difficult. The thick structure of the support 339 necessary to achieve the curved profile also limits the scanning performance of the radome.

FIG. 3 (*c*) shows the most desirable configuration of an electrically thin radome 363 over the antenna 305 and the base 331. The structure should be a small and thin as possible, with reduced height and width excursions beyond the bounds of the antenna 305 and minimal thick ness at any location where the waves propagate through the radome.

Figure 4:
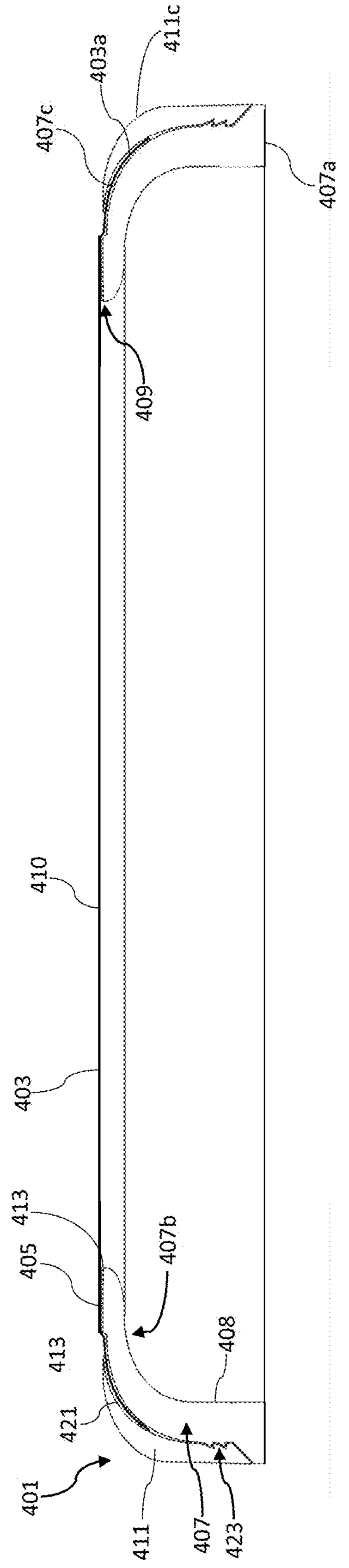
FIG. 4(*a*) is a vertical cross-section through a first embodiment of radome assembly in accordance with an aspect of the invention, showing a multi-piece hybrid clamping-bonding mounting structure for a fabric radome.
Figure 4:
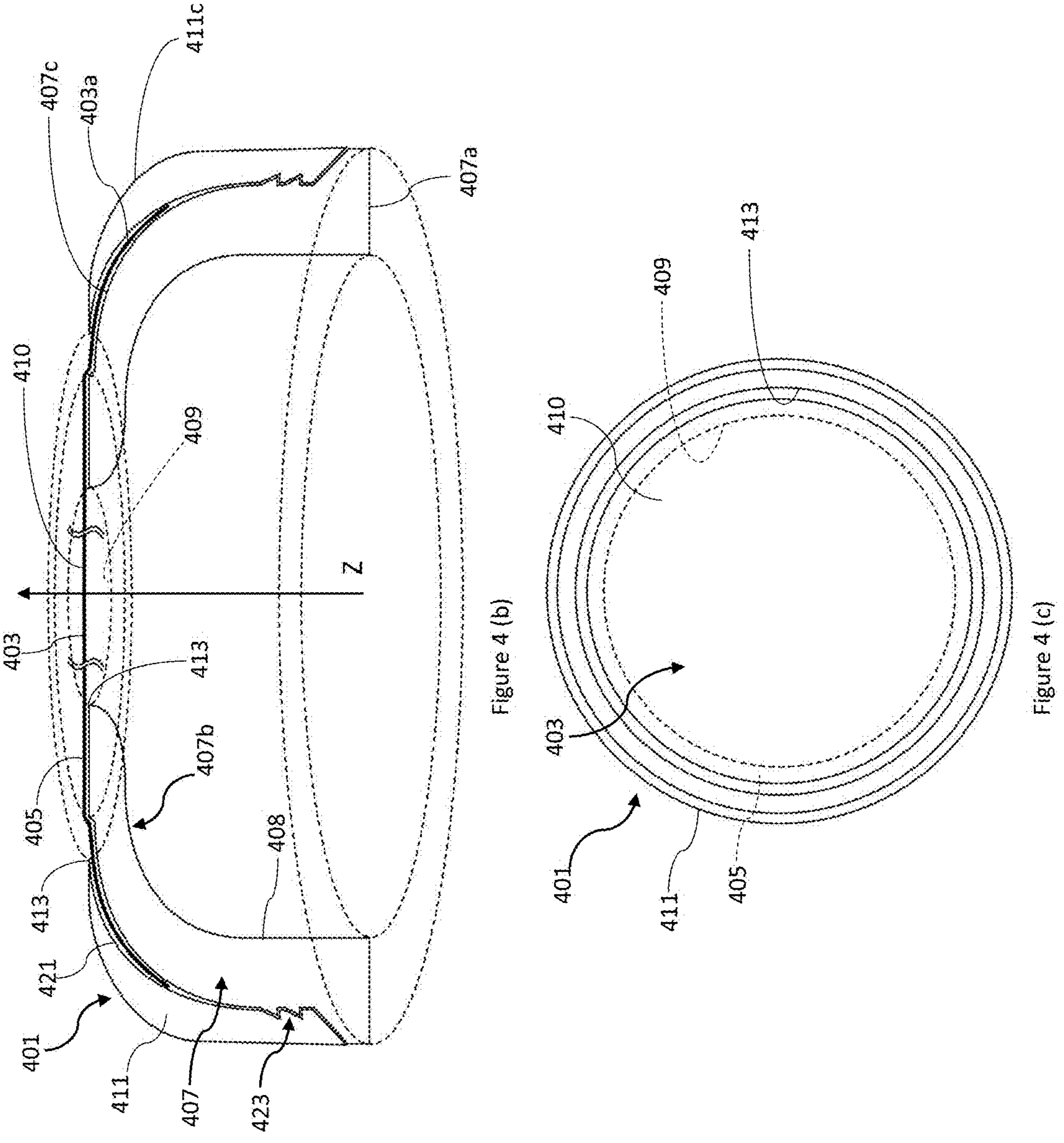

FIGS. 4 (*a*), (*b*) and (*c*) together illustrate a first embodiment of radome assembly for an antenna, including a novel mounting system 401 for a thin fabric radome over a substantially planar low-profile antenna.

The radome assembly comprises a rigid, circular, one-piece annular mounting ring 407, a flexible sheet 403 of radome fabric adhered to, and stretched across, the ring 407 and a one-piece circular clamping ring 411 on the exterior of the mounting ring 407. The composition and construction of the radome fabric are not limited by specific aspects of the invention, and the fabric used would depend on the specific circumstances, as would be appreciated by a person skilled in the art. Non-limiting examples of a suitable material would be a PTFE/Kevlar® composite fabric, cross-laminated PTFE film (i.e. without Kevlar®), a PVC coated fabric and a laminated PTFE/fiberglass composite but other materials could be used to form the sheet or film, depending on the specific circumstances. The thickness of the sheet or film will depend on the material chosen and the operating characteristics of the radome, but is likely to be in the range 0.1 to 2.0 mm, and typically in the range 0.1 to 0.5 mm, e.g. 0.15 mm.

The mounting ring 407 comprises an upstanding circular annular wall 408 extending initially from an innermost planar end face 407*a* in a direction parallel to the zenith direction Z, and then curving radially inwardly at its outermost (upper) end, as shown at 407*b*, forming an external curved convex rounded shoulder portion 407*c*. The mounting ring 407 is formed into an annular, planar, upwardly and outwardly facing bonding surface 405 at its uppermost end, to which the sheet 403 of radome fabric is bonded or adhered.

All parts of the annular bonding surface 405 lie in the same plane (perpendicular to the zenith direction Z) and the annular bonding surface 405 forms the longitudinally outermost portion of the mounting ring 407 (i.e. no other portion of the mounting ring 407 projects or extends upwardly or longitudinally outwardly of the annular bonding surface 405). The fabric 403 extends across the circular aperture 409 defined by the inner periphery of the annular bonding surface 405 and forms a planar enclosing wall 410 (which is shown discontinuously in FIG. 4(*b*)) parallel to the annular bonding surface 405.

The clamping ring 411 is annular and its inner face is complementarily-shaped with the external face of the mounting ring 407, to allow the clamping ring to fit over the mounting ring 407. The external face of the clamping ring also generally follows the external profile of the mounting ring 407, including an external curved convex shoulder portion 411*c* corresponding to the shoulder 407*c* of the mounting ring 407.

In this case, the flexible radome fabric 403 is stretched and chemically or otherwise bonded or adhered to the flat annular bonding surface 405 of the rigid mounting frame 407, similar to the case 331. However, the fabric is then cut to leave a length or skirt 403*a* of unadhered fabric extending radially outwardly of the annular bonding surface 405. That loose fabric, although not capable of stretching or compressing, can be captured (along with any wrinkles, etc.) by the conformal clamping ring 411 that contains a number of features designed to contain and secure the edge of the fabric radome.

First, the inner face of the clamping ring 411 and the outer face of the mounting ring 407 have a set of interengaging teeth and recesses forming a snap-fit connection 423 to allow the clamping ring 411 to be installed onto the mounting ring 407 to snap into place and be retained under pressure. This allows the installation to be performed rapidly without need for bolts, clamps, or other fasteners to be used. In this particular embodiment, the interengaging teeth and recesses forming the snap-fit connection are annular and extend completely around the inner face of the clamping ring 411 and completely around the outer face of the mounting ring 407. However, the interengaging teeth and recesses may instead be discontinuous and there may be a plurality of spaced-apart snap-fit connections formed by spaced-apart teeth and recesses. Adhesives may still also be used to make a permanent joint between mounting ring 407 and clamping ring 411, but the snap-fit connection 423 allows the adhesive to cure without the need for external force.

Second, the outermost/uppermost end (in the sense of the zenith direction Z) of the clamping ring 411 terminates in a sharp annular overhanging edge 413 at its radially innermost extent which forms a clamping feature that acts as the top surface of a conformal clamp to hold the periphery of the fabric radome down between clamping and mounting rings 411, 407. The angle of the sharp edge 413 and the underlying angle of the mounting ring 407 are selected to ensure that the resulting profile and joint is smooth and tight against the fabric or film without the possibility of moisture or debris incursion. The joint relies on slight deformation of both the radome material 403 and the point 413 of the clamping ring 411 to create a tight and watertight seal to prevent moisture from getting underneath the fabric 403 or between the clamping and mounting rings 411, 407 which might otherwise cause freeze damage.

Third, located between the snap-fit connection 423 and the clamping feature formed by the sharp edge 413 of the clamping ring 411, a small gap 421 exists between the opposed outer and inner faces respectively of the mounting and clamping rings 407, 411 to receive and contain the fabric skirt 403*a*. Since the fabric or film 403 is not elastic, some space to allow for non-smooth motion positioning of the material is beneficial. The gap 421 may be left empty other than the clamped material 403, or may be filled with a space-filling foam, glue, caulk, or other material to increase the strength of the joint or increase resistance to moisture incursion and damage.

The radome material 403 is mechanically supported by the chemical or other adhesive bond on the bonding surface 405; the clamping ring 411 does not maintain the tension of the radome material, but only protects the edge of the fabric or film and prevents moisture or debris incursion.

This structure 401 as illustrated in FIGS. 4 (*a*), (*b*) and (*c*) is highly suitable for substantially planar microwave and mmWave beam-steering antennas such as phased arrays, lens antenna arrays, VICTS antennas, metamaterial antennas, and liquid crystal antennas. It will be observed that there are no lips or steps across the top surface of the radome assembly in the vicinity of the aperture 409, and consequently there are no points for moisture or debris to accumulate, thus removing potential causes of performance degradation. By extending the fabric or film 403 beyond the mounting surface 405 and capturing the material 403 by the clamping ring, the edge of the material is hidden and contained, preventing moisture incursion and the potential of fraying of any integral fibers. In addition, the smooth, tapered profile allows for an attractive product design and appearance.

Figure 5:
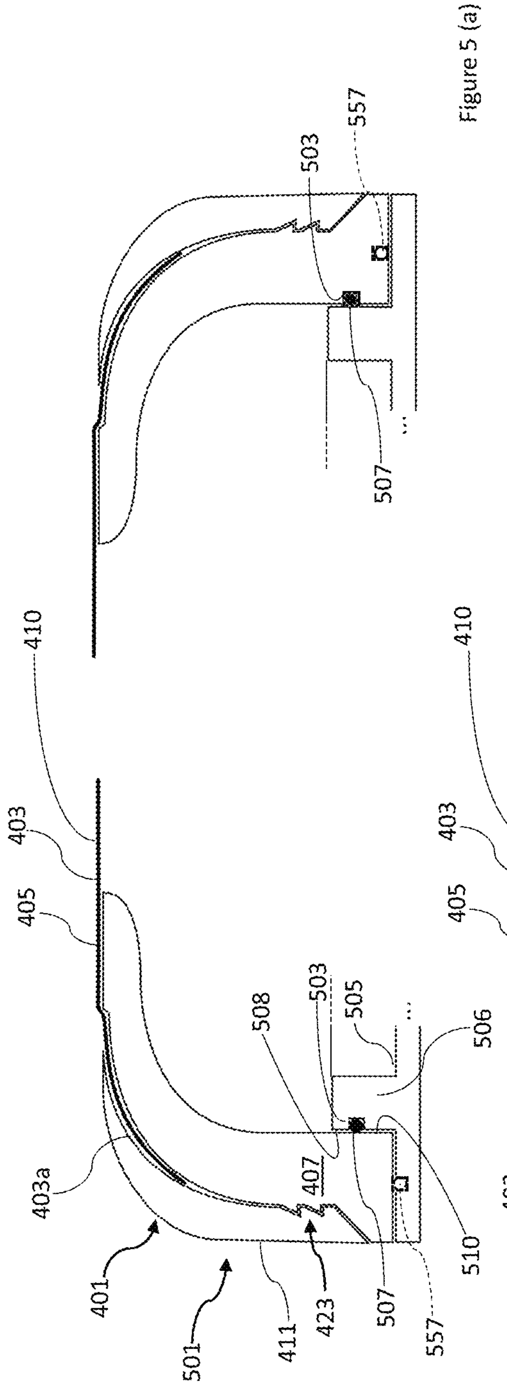
FIG. 5 (*a*) is a vertical cross-section through a first modification of the radome assembly of FIG. 4 (*a*), showing a vertical registration and sealing mechanism to secure a radome to an antenna base.
Figure 5:
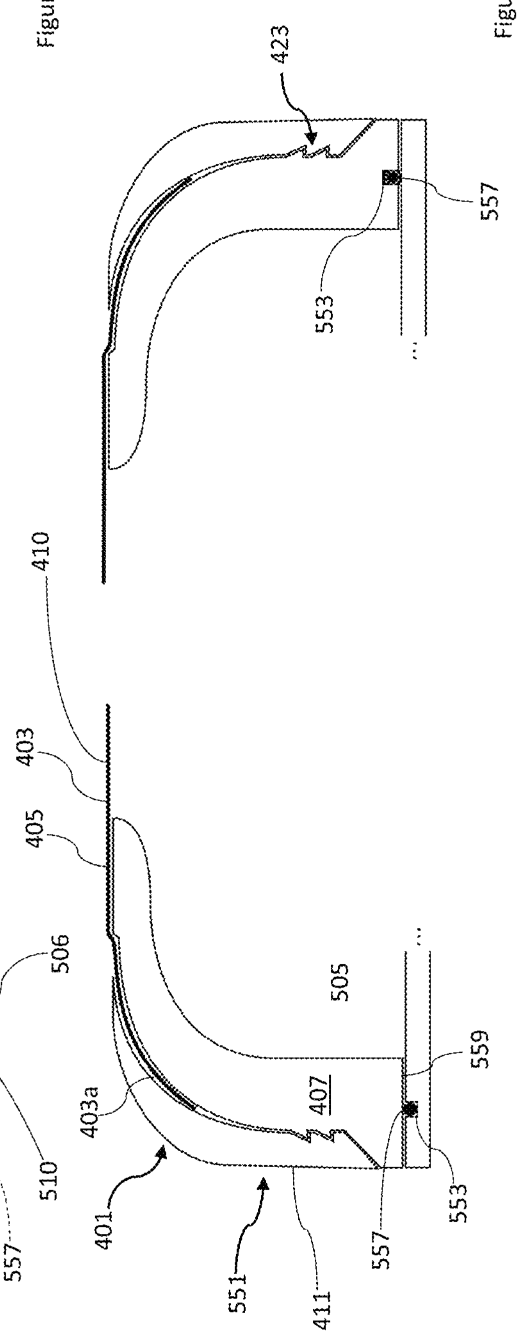

Such a radome 401 may be mounted to an antenna and base in a way so as to seal the interior of a structure in several ways, as shown in the variants of FIGS. 5(*a*) and 5(*b*), in which the same features referred to above and with respect to FIG. 4 are indicated by the same reference numerals.

In one variant 501 of the arrangement of FIG. 4, illustrated in FIG. 5 (*a*), a generally planar circular base 505 on which a flat antenna (not illustrated) is mounted has an upstanding annular wall 506 spaced from its periphery, and the outer face 508 of the wall 506 and the inner face 510 of the mounting ring 407 have a pair of substantially vertically-oriented (i.e. extending perpendicular to the planar base 505 and parallel to the zenith direction Z) mating surfaces that align and couple the two structures. A recess 503 and O-ring 507 or similar gasket or other seal is then used to provide a removable seal. The vertical sealing surface formed by the inner wall 510 of the mounting ring 407, possibly with a draft angle, combined with the O-ring or other seal or gasket 507 allows small manufacturing tolerances and variations to be absorbed and accounted for while still maintaining an efficient seal between the radome structure 401 and the base of the antenna 505.

The left-hand side of FIG. 5(*a*) illustrates the recess 503 and the O-ring seal 507 located on the outer face of the upstanding annular wall 506, but alternatively they could be located on the inner face of the mounting ring 407, as shown on the right-hand side of FIG. 5(*a*).

An alternative structure 551 is illustrated in FIG. 5 (*b*) with a generally planar circular base 505 on which a flat antenna (not illustrated) having a substantially horizontal upper planar mating surface 559, with a similar O-ring or other seal or gasket 557 and recess 553. Although not normally as desirable as the vertical mating surface 509 of FIG. 5(*a*), the horizontal mating surface 559 and gasket 557 will still function to seal the antenna between the base 505 and the radome structure 401.

The left-hand side of FIG. 5(*b*) illustrates the recess 553 and the O-ring seal 557 located on the upper face of the base 505, but alternatively they could be located on the lower (innermost) annular end face of the mounting ring 407, as shown on the right-hand side of FIG. 5(*b*).

In both cases 501 and 551, bolts or other fasteners may be used to removably fasten and secure the radome down against the base of the antenna, regardless of whether the substantially vertical or horizontal mating surfaces are selected.

The variants of FIGS. 5(*a*) and 5(*b*) are not mutually exclusive and both variants may be used in the same radome assembly, if desired, as illustrated in FIG. 5(*a*).

Figure 6A:
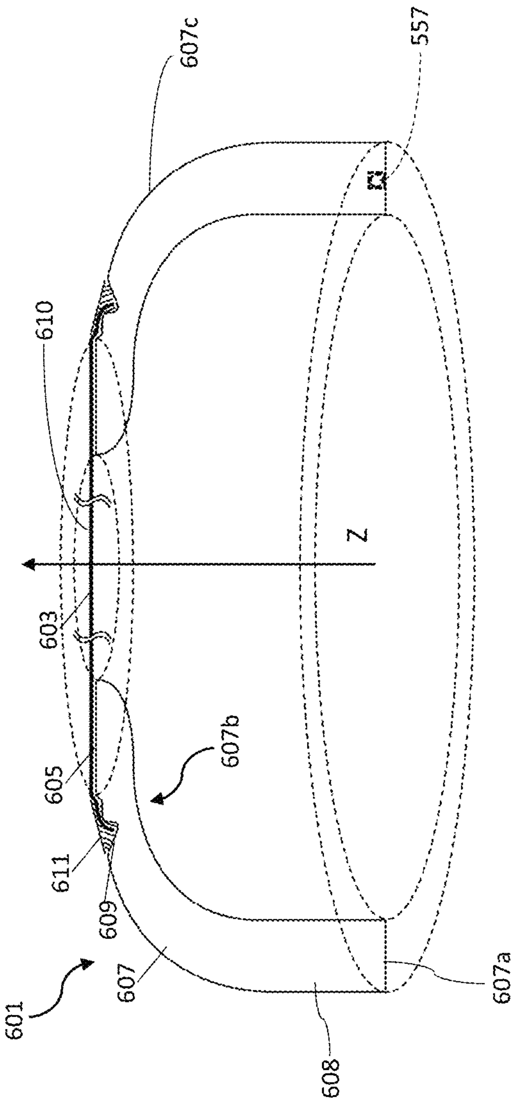
FIG. 6 (*a*) is a vertical cross-section through a second embodiment of radome assembly in accordance with an aspect of the invention, showing a modified one-piece bonded mount for a fabric radome with added features to contain the edge of the fabric to prevent fraying and moisture incursion.
Figure 6B:
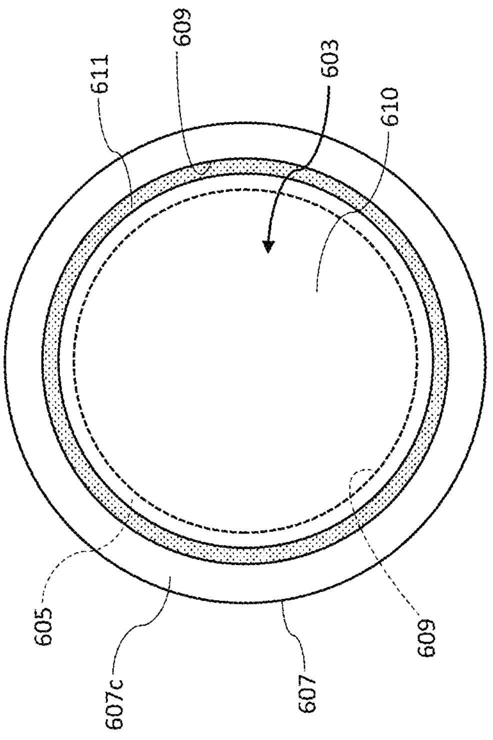

Depending on the properties of the fabric or film, an alternative radome assembly and material mounting implementation 601 is possible, as illustrated in FIG. 6.

The radome assembly of FIG. 6 comprises a rigid, circular, one-piece annular mounting ring 607 and a flexible sheet 603 of radome fabric adhered to, and stretched across, the ring 607. As for the previous embodiments, the composition and construction of the radome fabric are not limited by specific aspects of the invention, and the fabric used would depend on the specific circumstances, as would be appreciated by a person skilled in the art.

Similarly to the mounting ring 407 of FIGS. 4 and 5, the annular mounting ring 607 comprises an upstanding circular annular wall 608 extending initially from an innermost planar end face 607*a* in a direction parallel to the zenith direction Z, and then curving radially inwardly at its outermost (upper) end, as shown at 607*b*, forming an external curved convex rounded shoulder portion 607*c*. The mounting ring 607 is formed into an annular, planar, upwardly and outwardly facing bonding surface 605 at its uppermost end, to which the sheet 603 of radome fabric is bonded or adhered.

All parts of the annular bonding surface 605 lie in the same plane (perpendicular to the zenith direction Z) and the annular bonding surface 605 forms the longitudinally outermost portion of the mounting ring 607 (i.e. no other portion of the mounting ring 607 projects or extends upwardly or longitudinally outwardly of the annular bonding surface 605). The fabric 603 extends across the circular aperture 609 defined by the inner periphery of the annular bonding surface 605 and forms a planar enclosing wall 610 (which is shown discontinuously in FIG. 6(*a*)) parallel to the annular bonding surface 605.

The flexible fabric or other radome material 603 is cut or trimmed to extend a small distance only beyond the bonding surface 605 to fit into an annular recess or hole 609 in the mounting ring 607 immediately radially outward of the bonding surface 605, sufficient to loosely contain the peripheral edge of the material 603. The recess 609 is then filled or potted in a sealant, adhesive, epoxy, caulk, or other substance 611 which is set, cured or otherwise solidified, sufficient to enclose the peripheral edge of the material 603 and protect it from moisture incursion and fraying. The radome material 603 is completely tensioned and preserved in position by the annular bonding surface 605, so the potting material 611 only needs to contain the edge of the radome material, not exert substantial force. The potting process may be done in two steps, first securing the edge of the fabric to the bottom of the recess 609 while an external clamp or other means of holding the fabric holds the material in place during the initial cure/set, before a final layer of sealant 611 is used to fill the remaining gap and create a smooth surface without requiring clamping of the radome material 603.

The lower annular face of the mounting ring may also be sealed with respect to an antenna base (not illustrated) in the manner of FIG. 5(*a*) or 5(*b*), as shown schematically at 557 (although the recess and associated seal may instead be located in the antenna base, as described for the FIG. 5 variant).

Figure 7:
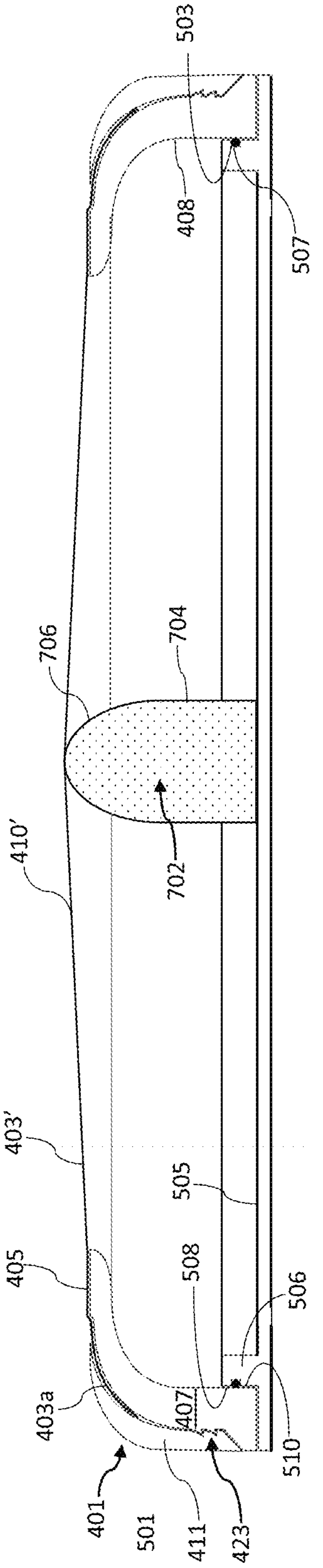
FIG. 7 is a vertical cross-section through a third embodiment of radome assembly in accordance with an aspect of the invention.

A further embodiment of an aspect of the invention is illustrated in FIG. 7. This embodiment is very similar to the embodiment of FIG. 5 (*a*), and the same reference numerals have been used to identify corresponding features.

As for the embodiment of FIG. 5 (*a*), in the embodiment of FIG. 7 a generally planar circular base 505 on which a flat antenna (not illustrated) is mounted has an upstanding annular wall 506 spaced from its periphery, and the outer face 508 of the wall 506 and the inner face 510 of the mounting ring 407 have a pair of substantially vertically-oriented (i.e. extending perpendicular to the planar base 505 and parallel to the zenith direction Z) mating surfaces that align and couple the two structures. A recess 503 and O-ring 507 or similar gasket or other seal is then used to provide a removable seal. The vertical sealing surface formed by the inner wall 510 of the mounting ring 407, possibly with a draft angle, combined with the O-ring or other seal or gasket 507 allows small manufacturing tolerances and variations to be absorbed and accounted for while still maintaining an efficient seal between the radome structure 401 and the base of the antenna 505.

A pillar 702 of low dielectric constant foam is also mounted at the centre of the circular base 505 and extends upwardly from the upper surface of the base 505. The pillar 702 has a cylindrical base portion 704 extending from the base 505 and a domed head 706 at the upper end of the cylindrical portion 704. The outermost end of the domed head 706 of the pillar 702 is located outwardly of the flat annular bonding surface 405 of the rigid mounting frame 407 to which the flexible radome fabric 403' chemically or otherwise bonded or adhered. Consequently, the radome fabric 403' is stretched over the outer ends of the pillar 702, causing the centre of the fabric to be raised above the level of the annular bonding surfaces 405, resulting in the radome fabric 403' assuming a shallow convex conical shape, forming an enclosing wall 410' of that shape, and thereby preventing puddles of water or other liquids from collecting on the radome fabric 403'.

Although the pillar 702 has been described as a variant of the embodiment of FIG. 5 (*a*), it can be applied to all of the embodiments of the present disclosure.

Figure 8:
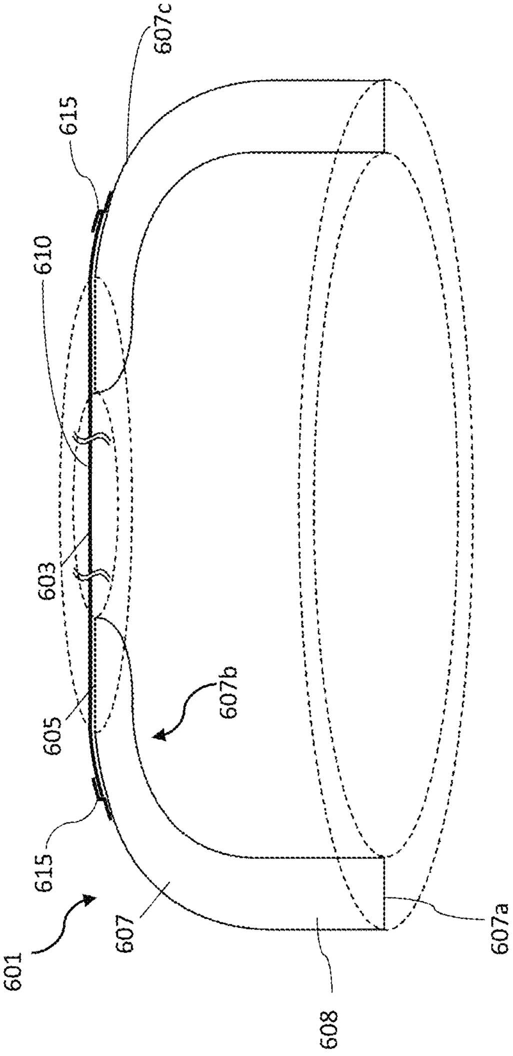
FIG. 8 is a vertical cross-section through a further embodiment of radome assembly in accordance with an aspect of the invention, showing a modified one-piece bonded mount for a fabric radome with added features to contain the edge of the fabric to prevent fraying and moisture incursion.

A further embodiment of an aspect of the invention is illustrated in FIG. 8. This embodiment is very similar to the embodiment of FIG. 6, and the same reference numerals have been used to identify corresponding features.

The radome assembly of FIG. 8 comprises a rigid, circular, one-piece annular mounting ring 607 and a flexible sheet 603 of radome fabric adhered to, and stretched across, the ring 607. As for the previous embodiments, the composition and construction of the radome fabric are not limited by specific aspects of the invention, and the fabric used would depend on the specific circumstances, as would be appreciated by a person skilled in the art.

All parts of the annular bonding surface 605 lie in the same plane (perpendicular to the zenith direction Z) and the annular bonding surface 605 forms the longitudinally outermost portion of the mounting ring 607 (i.e. no other portion of the mounting ring 607 projects or extends upwardly or longitudinally outwardly of the annular bonding surface 605). The fabric 603 extends across the circular aperture 609 defined by the inner periphery of the annular bonding surface 605 and forms a planar enclosing wall 610 (which is shown discontinuously in FIG. 6(*a*)) parallel to the annular bonding surface 605.

The flexible fabric or other radome material 603 is cut or trimmed to extend a small distance only beyond the bonding surface 605. However, in contrast to the FIG. 6 embodiment, in which the radome material 603 fits into an annular recess or hole 609 in the mounting ring 607 immediately radially outward of the bonding surface 605, the recess 609 is omitted. Instead, the upper face of the mounting ring 607 immediately outward of the bonding surface 605 forms a continuous smoothly curved shoulder 607*c* over which the periphery of the radome material 603 extends. A ring of securing tape 615 is placed over the joint between the radome material 403 and the smoothly curved shoulder 607*c* of the support ring 406 and is heat-sealed to the radome material 403 and the shoulder 607*c*. Alternatively the undersurface of the securing tape may be coated with an adhesive or other bonding agent to secure it to the radome material 403 and the shoulder 607*c*.

It is noted that the drawings may illustrate, and the description and claims may use geometric or relational terms, such as side, edge, top, bottom, planar, coplanar, parallel, perpendicular, rectangular, square, triangular, circular, polygon, pentagon, equilateral triangle, irregular polygon, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

Moreover, the term “annular” is not restricted to circular formations but also includes any ring-like formation, including elliptical, polygonal or other shapes.

Numerous applications of the disclosure will readily occur to those skilled in the art. Therefore, it is not desired to limit the disclosure to the specific examples disclosed or the exact construction and operation shown and described.

Rather, all suitable modifications and equivalents may be resorted to, falling within the scope of the disclosure.

The invention claimed is:

1. A radome assembly for an antenna, comprising:

a mounting ring comprising an annular bonding surface, wherein the annular bonding surface is substantially planar, wherein the mounting ring comprises an annular wall on which the annular bonding surface is formed, and wherein the annular bonding surface is formed on a radially innermost portion of an upper surface of the annular wall;

a layer of radome fabric or film bonded to the annular bonding surface and comprising:

a first portion extending radially inwardly of the annular bonding surface and tensioned by the annular bonding surface; and a second portion extending radially outwardly of the annular bonding surface; and an annular enclosing element located radially outwardly of the annular bonding surface which encloses or covers at least some of the second portion.

2. A radome assembly as claimed in claim 1, wherein the annular enclosing element encloses or covers a periphery of the radome fabric or film.

3. A radome assembly as claimed in claim 1, wherein all portions of the annular bonding surface lie in a same plane.

4. A radome assembly as claimed in claim 1, wherein the first portion is continuous and substantially planar.

5. A radome assembly as claimed in claim 1, comprising a pillar which extends outwardly beyond the annular bonding surface, with which the radome fabric or film is in contact.

6. A radome assembly as claimed in claim 5, wherein the pillar is located centrally with respect to the annular bonding surface.

7. A radome assembly as claimed in claim 5, wherein the pillar comprises a foam material.

8. A radome assembly as claimed in claim 1, wherein the annular bonding surface is located at an upwardmost portion of the mounting ring.

9. A radome assembly as claimed in claim 1, wherein the annular enclosing element comprises an annular member which is positionable over at least some of the second portion.

10. A radome assembly as claimed in claim 9, wherein the annular member is positionable over a periphery of the radome fabric or film.

11. A radome assembly as claimed in claim 9, wherein an inner face of the annular member is complementarily-shaped with an outer face of the mounting ring.

12. A radome assembly as claimed in claim 9, wherein at least some of the second portion is clamped between the mounting ring and the annular member.

13. A radome assembly as claimed in claim 9, wherein the annular member is releasably attached.

14. A radome assembly as claimed in claim 13, wherein the annular member is releasably attached to the mounting ring.

15. A radome assembly as claimed in claim 1, wherein the annular enclosing element comprises a cured or set annular member.

16. A radome assembly as claimed in claim 15, wherein the annular enclosing element comprises a cured sealant.

17. A radome assembly as claimed in claim 15, wherein the mounting ring comprises an annular recess radially outwardly of the annular bonding surface which receives at least some of the second portion and the cured or set annular member.

18. A radome assembly as claimed in claim 17, wherein a periphery of the radome fabric or film is received in the annular recess.

19. A radome assembly as claimed in claim 15, comprising a continuous smooth profile between the cured or set annular member and an outer surface of the mounting ring.

20. A radome assembly as claimed in claim 15, comprising a continuous smooth profile between the cured or set annular member and the second portion of the radome fabric or film bonded to the annular bonding surface.

21. A radome assembly as claimed in claim 1, wherein the radome fabric or film is flexible.

22. A radome assembly for an antenna, comprising:

a mounting ring comprising an annular bonding surface, wherein the annular bonding surface is substantially planar;

a layer of radome fabric or film bonded to the annular bonding surface and comprising:

a first portion extending radially inwardly of the annular bonding surface and tensioned by the annular bonding surface; and a second portion extending radially outwardly of the annular bonding surface; and an annular enclosing element located radially outwardly of the annular bonding surface which encloses or covers at least some of the second portion, wherein the mounting ring comprises an outer surface which includes a convexly curved portion radially outwardly of the annular bonding surface.

23. A radome assembly for an antenna, comprising:

a mounting ring comprising an annular bonding surface, wherein the annular bonding surface is substantially planar;

a layer of radome fabric or film bonded to the annular bonding surface and comprising:

a first portion extending radially inwardly of the annular bonding surface and tensioned by the annular bonding surface; and a second portion extending radially outwardly of the annular bonding surface; and an annular enclosing element located radially outwardly of the annular bonding surface which encloses or covers at least some of the second portion, wherein the annular enclosing element comprises a ring of tape secured to a periphery of the radome fabric or film and to a portion of the mounting ring located radially outward of the periphery of the radome fabric or film.

* * * * *